US010969120B2

(12) United States Patent
Bergmann et al.

(10) Patent No.: US 10,969,120 B2
(45) Date of Patent: Apr. 6, 2021

(54) HOT WATER UNIT FLUID SUPPLY CONTROL SYSTEMS AND METHODS

(71) Applicant: South East Water Corporation, Frankston (AU)

(72) Inventors: David Bergmann, Warranwood (AU); Steve Paterson, Chelsea (AU)

(73) Assignee: South East Water Corporation, Frankston (AU)

( * ) Notice: Subject to any disclaimer, the term of this patent is extended or adjusted under 35 U.S.C. 154(b) by 186 days.

(21) Appl. No.: 16/308,737

(22) PCT Filed: Jun. 9, 2017

(86) PCT No.: PCT/AU2017/050579
§ 371 (c)(1),
(2) Date: Dec. 10, 2018

(87) PCT Pub. No.: WO2017/210750
PCT Pub. Date: Dec. 14, 2017

(65) Prior Publication Data
US 2019/0145633 A1  May 16, 2019

(30) Foreign Application Priority Data
Jun. 10, 2016 (AU) ................................ 2016902271

(51) Int. Cl.
*E03B 1/04* (2006.01)
*F24D 19/10* (2006.01)
(Continued)

(52) U.S. Cl.
CPC ............ *F24D 19/1066* (2013.01); *E03B 1/00* (2013.01); *E03B 1/04* (2013.01); *E03B 3/02* (2013.01);
(Continued)

(58) Field of Classification Search
CPC ..... E03B 1/00; E03B 1/04; E03B 3/02; E03B 3/03; E03B 7/074; E03B 7/078; F24D 17/0005; F24D 17/0001
See application file for complete search history.

(56) References Cited

U.S. PATENT DOCUMENTS 5,564,462 A * 10/1996 Storch ................. F24D 17/0078
122/13.3
7,966,099 B2 * 6/2011 Fima ..................... G01M 3/2807
700/276
(Continued)

FOREIGN PATENT DOCUMENTS

| AU | 2007200913 A1 | 10/2007 |
| AU | 2013205704 A1 | 11/2013 |
| EP | 1201834 B1 | 11/2006 |

OTHER PUBLICATIONS

Aug. 16, 2017—International Search Report and Written Opinion for PCT Application PCT/AU2017/050579.

*Primary Examiner* — Gregory A Wilson
(74) *Attorney, Agent, or Firm* — Banner & Witcoff, Ltd.

(57) ABSTRACT

A hot water unit fluid supply control system comprises a switching device coupled to a hot water unit, a rainwater tank and a potable water source. The switching device is configured to selectively switch between a first state, which allows fluid communication between the hot water unit and the rainwater tank, and a second state, which allows fluid communication between the hot water unit and the potable water source. The hot water unit fluid supply control system comprises a control unit configured to: receive fluid characteristic information associated with fluid in the hot water unit from one or more sensors; activate or deactivate a pump of the rainwater tank based on a comparison of a fluid characteristic parameter of the fluid characteristic informa- (Continued)

tion with requirements of the hot water unit to thereby cause the switching device to assume the first or second state.

21 Claims, 5 Drawing Sheets

(51) Int. Cl.
  *E03B 3/02* (2006.01)
  *F24D 17/00* (2006.01)
  *E03B 1/00* (2006.01)
  *E03B 3/03* (2006.01)
  *E03B 7/07* (2006.01)
  *G05D 7/06* (2006.01)

(52) U.S. Cl.
  CPC ............ *E03B 3/03* (2013.01); *E03B 7/074* (2013.01); *E03B 7/078* (2013.01); *F24D 17/001* (2013.01); *F24D 17/0005* (2013.01); *F24D 19/1051* (2013.01); *G05D 7/0623* (2013.01); *Y02A 20/108* (2018.01); *Y02B 30/18* (2013.01)

(56) References Cited

U.S. PATENT DOCUMENTS

| | | | |
|---|---|---|---|
| 2009/0234513 A1* | 9/2009 | Wiggins | F24D 19/1051 700/300 |
| 2012/0181235 A1 | 7/2012 | Leonard | |
| 2014/0230914 A1* | 8/2014 | Jaynes | E03B 7/04 137/14 |
| 2017/0159270 A1* | 6/2017 | Garg | E03B 11/14 |
| 2018/0021166 A1* | 1/2018 | Rose | A61F 7/0085 607/104 |

* cited by examiner

HOT WATER UNIT FLUID SUPPLY CONTROL SYSTEMS AND METHODS

CROSS-REFERENCE TO RELATED APPLICATIONS

This application is a U.S. National Stage application under 35 U.S.C. § 371 of International Application PCT/AU2017/050579 (published as WO 2017/210750 A1), filed Jun. 9, 2017, which claims the benefit of priority to Application AU 2016902271, filed Jun. 10, 2016. Benefit of the filing date of each of these prior applications is hereby claimed. Each of these prior applications is hereby incorporated by reference in its entirety.

TECHNICAL FIELD

Described embodiments relate to methods and systems for controlling fluid supply to a hot water unit. Some embodiments relate to hot water unit fluid supply control systems and some embodiments relate to methods of controlling a hot water unit fluid supply control system.

BACKGROUND

It is desired to address or ameliorate one or more shortcomings or disadvantages associated with known systems and methods for controlling fluid supply to a hot water unit.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a hot water unit fluid supply control system comprising: a switching device coupled to a hot water unit, a rainwater tank and a potable water source, the switching device configured to selectively switch between a first state, which allows fluid communication between the hot water unit and the rainwater tank, and a second state, which allows fluid communication between the hot water unit and the potable water source; and a control unit configured to: receive fluid characteristic information associated with fluid in the hot water unit from one or more sensors; and cause the switching device to assume the first or second state based on a comparison of a fluid characteristic parameter of the fluid characteristic information with requirements of the hot water unit.

In some embodiments, the requirements comprise a fluid characteristic threshold value and the control unit is configured to cause the switching device to assume the first state in response to determining that the fluid characteristic parameter is greater than the fluid characteristic threshold value and to assume the second state in response to determining that the fluid characteristic parameter is less than the fluid characteristic threshold value.

In some embodiments, the switching device is configured to switch between the first and second states in response to detecting a pressure change in fluid supply from the rainwater tank. In some embodiments, the control unit is configured to activate a pump of the rainwater tank to cause the switching device to assume the first state and to deactivate a pump of the rainwater tank to cause the switching device to assume the second state. For example, the switching device may comprise an automatic hydraulic switch. In some embodiments, the switching device comprises: a first inlet coupled to a first conduit arranged to convey fluid from the potable water source to the switching device; a second inlet coupled to a second conduit arranged to convey fluid from the rainwater tank to the switching device; and an outlet coupled to a third conduit arranged to convey fluid from the switching device to the hot water unit.

In some embodiments, at least one of the one or more sensors is configured to detect fluid temperature in the hot water unit and the fluid characteristic parameter comprises a temperature value. In some embodiments, at least one of the one or more sensors is configured to detect flow rate of fluid exiting the hot water unit and the fluid characteristic parameter comprises at least one of a flow rate value and a fluid volume value. In some embodiments, at least one of the one or more sensors is configured to detect a measure of water quality of fluid in the hot water unit and the fluid characteristic parameter comprises a water quality value. In some embodiments, at least one of the one or more sensors is configured to detect operations information associated with an ultraviolet (UV) treatment unit and the control unit is configured to cause the switching device to assume the first or second state based on a comparison of an operations parameter of the operations information with an operations threshold value.

In some embodiments, the operations parameter comprises an indication of whether the UV treatment unit is operating effectively. In some embodiments, the control unit is configured to cause the switching device to assume the first state in response to determining that the operations parameter is greater than the operations threshold value and to assume the second state in response to determining that the operations parameter is less than the operations threshold value. In some embodiments, the UV treatment unit is disposed upstream of the hot water unit and downstream of the switching device such that fluid conveyed from the rainwater tank or potable water source passes through the UV treatment unit before being conveyed to the hot water unit.

In some embodiments, the hot water unit fluid supply control system comprises the UV treatment unit. In some embodiments, the hot water unit fluid supply control system comprises one or more of the hot water unit, the rainwater tank and the one or more sensors.

Some embodiments relate to a hot water unit fluid supply control system comprising: a switching device coupled to a hot water unit, a rainwater tank and a potable water source, the switching device configured to selectively switch between a first state, which allows fluid communication between the hot water unit and the rainwater tank, and a second state, which allows fluid communication between the hot water unit and the potable water source; and a control unit configured to: receive operations information associated with an ultraviolet (UV) treatment unit in fluid communication with the hot water unit from one or more sensors; and cause the switching device to assume the first or second state based on a comparison of an operations parameter of the operations information with requirements of the hot water unit.

In some embodiments, the requirements comprise an operations threshold value the control unit is configured to cause the switching device to assume the first state in response to determining that the operations parameter is greater than the threshold value and to assume the second state in response to determining that the operations parameter is less than the operations threshold value.

In some embodiments, the hot water unit fluid supply control system comprises the switching device is configured to switch between the first and second states in response to detecting a pressure change in fluid supply from the rainwater tank. In some embodiments, the control unit is configured to activate a pump of the rainwater tank to cause the switching device to assume the first state and to deactivate a pump of the rainwater tank to cause the switching device to assume the second state. For example, the switching device may comprise an automatic hydraulic switch. In some embodiments, the switching device comprises: a first inlet coupled to a first conduit arranged to convey fluid from the potable water source to the switching device; a second inlet coupled to a second conduit arranged to convey fluid from the rainwater tank to the switching device; and an outlet coupled to a third conduit arranged to convey fluid from the switching device to the hot water unit.

In some embodiments, the operations parameter comprises an indication of whether the UV treatment unit is operating effectively. In some embodiments, the UV treatment unit is disposed upstream of the hot water unit and downstream of the switching device such that fluid conveyed from the rainwater tank or potable water source passes through the UV treatment unit before being conveyed to the hot water unit. In some embodiments, the hot water unit fluid supply control system comprises the UV treatment unit.

In some embodiments, the one or more sensors are configured to detect fluid characteristic information associated with fluid in the hot water unit; and the control unit is configured to cause the switching device to assume the first or second state based on a comparison of a fluid characteristic parameter of the fluid characteristics information with a fluid characteristic threshold value. In some embodiments, the control unit is configured to cause the switching device to assume the first state in response to determining that the fluid characteristics parameter is greater than the fluid characteristic threshold value and to assume the second state in response to determining that the fluid characteristics parameter is less than the fluid characteristic threshold value. In some embodiments, at least one of the one or more sensors is configured to detect fluid temperature in the hot water unit and the fluid characteristic parameter comprises a temperature value. In some embodiments, at least one of the one or more sensors is configured to detect flow rate of fluid exiting the hot water unit and the fluid characteristic parameter comprises at least one of a flow rate value and a fluid volume value. In some embodiments, at least one of the one or more sensors is configured to detect a measure of water quality of fluid in the hot water unit and the fluid characteristic parameter comprises a water quality value.

In some embodiments, the hot water unit fluid supply control system comprises one or more of the hot water unit, the rainwater tank, the UV treatment unit and the one or more sensors.

Some embodiments relate to a method of controlling fluid supply to a hot water unit, the method operable by a hot water unit control system comprising a switching device coupled to the hot water unit, a rainwater tank and a potable water source, the switching device is configured to selectively switch between a first state, which allows fluid communication between the hot water unit and the rainwater tank, and a second state, which allows fluid communication between the hot water unit and the potable water source, and a control unit, the method comprising: receiving, by the control unit, fluid characteristic information associated with fluid in the hot water unit from one or more sensors; and causing, by the control unit, the switching device to assume the first state or the second state based on a comparison of a fluid characteristic parameter of the fluid characteristic information with requirements of the hot water unit.

In some embodiments, the requirements comprise a fluid characteristic threshold value and causing the switching device to assume the first state or the second state comprises causing the switching device to assume the first state in response to determining that the fluid characteristic parameter of the fluid characteristic information is greater than the fluid characteristic threshold value and causing the switching device to assume the second state in response to determining that a parameter of the fluid characteristic information is less than the fluid characteristic threshold value.

In some embodiments, the switching device is configured to switch between the first and second states in response to detecting a pressure change in fluid supply from the rainwater tank. In some embodiments, causing the switching device to assume the first state or the second state comprises causing a pressure change in fluid supply from the rainwater tank to cause the switching device to switch between the first and second states. In some embodiments, causing the switching device to assume the first state comprises activating a pump of the rainwater tank. In some embodiments, causing the switching device to assume the second state comprises deactivating a pump of the rainwater tank.

In some embodiments, at least one of the one or more sensors is configured to detect fluid temperature in the hot water unit and the parameter of the fluid characteristic information comprises a temperature value. In some embodiments, at least one of the one or more sensors is configured to detect flow rate of fluid exiting the hot water unit and the parameter of the fluid characteristic information comprises at least one of a flow rate value and a fluid volume value. In some embodiments, at least one of the one or more sensors is configured to detect a measure of water quality of fluid in the hot water unit and the fluid characteristic parameter comprises a water quality value. In some embodiments, at least one of the one or more sensors is configured to detect operations information associated with the UV treatment unit and the method further comprises causing the switching device to assume the first or second state based on a comparison of an operations parameter of the operations information with an operations threshold value. For example, the operations parameter may comprise an indication of whether the UV treatment unit is operating effectively.

Some embodiments relate to a method of controlling fluid supply to a hot water unit, the method operable by a hot water unit control system comprising a switching device coupled to a hot water unit, a rainwater tank and a potable water source, the switching device is configured to selectively switch between a first state, which allows fluid communication between the hot water unit and the rainwater tank, and a second state, which allows fluid communication between the hot water unit and the potable water source, and a control unit, the method comprising: receiving, by the control unit, operations information associated with an ultraviolet (UV) treatment unit in fluid communication with the hot water unit from one or more sensors; and causing, by the control unit, the switching device to assume the first state or the second state based on a comparison of an operations parameter of the operations information with requirements of the hot water unit.

In some embodiments, the requirements comprise an operations threshold value and causing the switching device to assume the first state or the second state comprises causing the switching device to assume the first state in response to determining that the operations parameter of the operations information is greater than the operations threshold value and causing the switching device to assume the second state in response to determining that the operations parameter of the operations information is less than the operations threshold value.

In some embodiments, the switching device is configured to switch between the first and second states in response to detecting a pressure change in fluid supply from the rainwater tank. In some embodiments, causing the switching device to assume the first state or the second state comprises causing a pressure change in fluid supply from the rainwater tank to cause the switching device to switch between the first and second states. In some embodiments, causing the switching device to assume the first state comprises activating a pump of the rainwater tank. In some embodiments, causing the switching device to assume the second state comprises deactivating a pump of the rainwater tank. For example, the operations parameter may comprise an indication of whether the UV treatment unit is operating effectively.

In some embodiments, the one or more sensors are configured to detect fluid characteristic information associated with fluid in the hot water unit and the control unit is configured to cause the switching device to assume the first or second state based on a comparison of a fluid characteristic parameter of the fluid characteristics information with a fluid characteristic threshold value. In some embodiments, causing the switching device to assume the first state or the second state comprises causing the switching device to assume the first state in response to determining that the fluid characteristic parameter of the fluid characteristic information is greater than the fluid characteristic threshold value and causing the switching device to assume the second state in response to determining that a parameter of the fluid characteristic information is less than the fluid characteristic threshold value.

In some embodiments, at least one of the one or more sensors is configured to detect fluid temperature in the hot water unit and the fluid characteristic parameter comprises a temperature value. In some embodiments, at least one of the one or more sensors is configured to detect flow rate of fluid exiting the hot water unit and the fluid characteristic parameter comprises at least one of a flow rate value and a fluid volume value. In some embodiments, at least one of the one or more sensors is configured to detect a measure of water quality of fluid in the hot water unit and the fluid characteristic parameter comprises a water quality value.

Some embodiments relate to a method of controlling fluid supply to a hot water unit at an installation, the method operable by a hot water unit control system comprising a switching device coupled to the hot water unit, a rainwater tank and a potable water source, wherein the switching device is configured to selectively switch between a first state, which allows fluid communication between the hot water unit and the rainwater tank, and a second state, which allows fluid communication between the hot water unit and the potable water source, and a control unit, the method comprising: receiving, by the control unit, fluid characteristic information associated with fluid in the hot water unit from one or more sensors, wherein the fluid characteristic information is indicative of a volume of usable water in the hot water unit; determining, from a usage pattern associated with the installation, a predicted volume of water required in a timeframe; and causing, by the control unit, the switching device to assume the first state or the second state based on a comparison of the volume of usable water with the predicted volume of water required for the timeframe. For example, the timeframe may be associated with a particular time period of a day, or a particular day or the week, month or year.

In some embodiments, causing the switching device to assume the first state or the second state comprises causing the switching device to assume the first state in response to determining that the volume of usable water is greater than the predicted volume of water required and causing the switching device to assume the second state in response to determining that the volume of usable water is not greater than the predicted volume of water required.

In some embodiments, the switching device is configured to switch between the first and second states in response to detecting a pressure change in fluid supply from the rainwater tank. For example, causing the switching device to assume the first state or the second state may comprise causing a pressure change in fluid supply from the rainwater tank to cause the switching device to switch between the first and second states.

In some embodiments, causing the switching device to assume the first state comprises activating a pump of the rainwater tank and in some embodiments, causing the switching device to assume the second state comprises deactivating a pump of the rainwater tank.

In some embodiments, at least one of the one or more sensors is configured to detect fluid temperature in the hot water unit and wherein the fluid characteristic information comprises a temperature value. In some embodiments, at least one of the one or more sensors is configured to detect flow rate of fluid exiting the hot water unit and wherein the fluid characteristic information comprises at least one of a flow rate value and a fluid volume value. In some embodiments, at least one of the one or more sensors is configured to detect a measure of water quality of fluid in the hot water unit and wherein the fluid characteristic parameter comprises a water quality value.

In some embodiments, the control unit is configured to determine a usage pattern associated with the installation by storing usage information associated with the installation over a period of time, wherein the usage pattern comprises a plurality of usage entries, wherein each usage entry comprising fluid characteristic information indicative of a volume of usable water in the hot water unit for a timeframe. The control unit may be configured to update the usage pattern periodically or in response to receiving fluid characteristic information associated with fluid in the hot water unit from one or more sensors.

In some embodiments, the control unit is configured to receive a usage pattern associated with the installation from a remote server, and wherein the control unit is configure to provide to the remote server is usage information associated with the installation over a period of time, wherein the usage information comprises a plurality of usage entries, wherein each usage entry comprising fluid characteristic information indicative of a volume of usable water in the hot water unit for a timeframe.

Some embodiments relate to a hot water unit fluid supply control system comprising: a switching device coupled to a hot water unit, a rainwater tank and a potable water source associated with an installation, the switching device configured to selectively switch between a first state, which allows fluid communication between the hot water unit and the rainwater tank, and a second state, which allows fluid communication between the hot water unit and the potable water source; and a control unit configured to perform any of the described methods.

BRIEF DESCRIPTION OF DRAWINGS

Embodiments are described in further detail below, by way of example and with reference to the accompanying drawings, in which.

DESCRIPTION OF EMBODIMENTS

Figure 1:
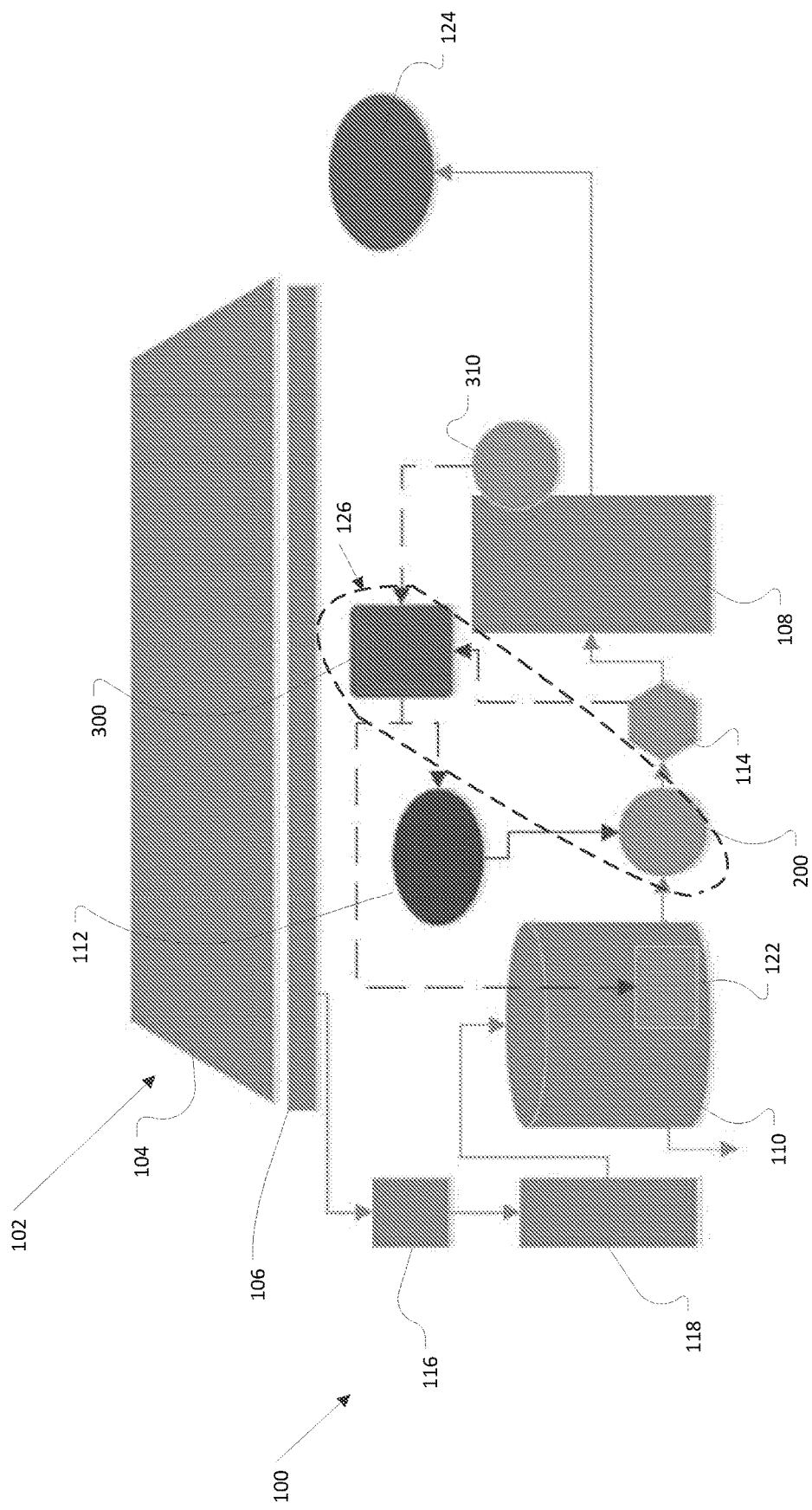
FIG. 1 is a schematic view of an installation comprising a hot water unit fluid supply control system, according to some embodiments.

Described embodiments relate to methods and systems for controlling a hot water unit, and in particular, controlling fluid supply to the hot water unit. Some embodiments relate to hot water unit fluid supply control systems and some embodiments relate to methods of controlling a hot water unit control system.

Some embodiments relate to a hot water unit fluid supply control system comprising a switching device for selectively controlling fluid supply to the hot water unit and a control unit for controlling activation/deactivation of the switching device. The switching device may be coupled to a hot water unit, a rainwater tank and a potable water source and may be configured to switch between a first state, to allow fluid communication between the hot water unit and the rainwater tank, and a second state, to allow fluid communication between the hot water unit and the potable water source. In some embodiments, the switching device may be configured to assume the first state or the second state based on a comparison of fluid characteristic information sensed or detected from the hot water unit with requirements for the hot water unit. For example, such fluid characteristic information may comprise fluid temperature, fluid flow rate, and/or fluid quality. In some embodiments, the switching device may be configured to assume a first state or second state based on a comparison of detected operations information of a ultraviolet (UV) treatment unit associated with the hot water unit and requirements for the hot water unit. In some embodiments, the switching device is an electrically actuatable switching device and the control unit is configured to transmit a signal to the electric switching device to trigger switching of the switching device. The control unit may also be configured to activate a pump of the rainwater tank when the switching device assumes the first state and to deactivate the pump of the rainwater tank when the switching device assumes the second state. The control unit may also be configured to activate and deactivate a pump of the rainwater tank. For example, the control unit may be configured to activate the pump when the switching device assumes the first state and to deactivate the pump of the rainwater tank when the switching device assumes the second state. In some embodiments, the control unit is configured to activate or deactivate a pump of the rainwater tank to trigger switching of the switching device. Some embodiments relate to methods of controlling such hot water unit control systems.

Although rainwater is often used for purposes such as toilet flushing, clothes laundering or garden watering, it is rarely used for other household purposes unless no other supply option is available. This is primarily due to a concern that untreated rainwater may not be as safe as domestic or potable water. However, by employing the hot water unit fluid supply control system described herein, a reliable supply of hot water may be provided while mitigating the chance of incidental and unintentional consumption of potentially unsafe water by ensuring that the temperature and/or quality of the water in the hot water unit meets an appropriate standard.

Figure 2A:
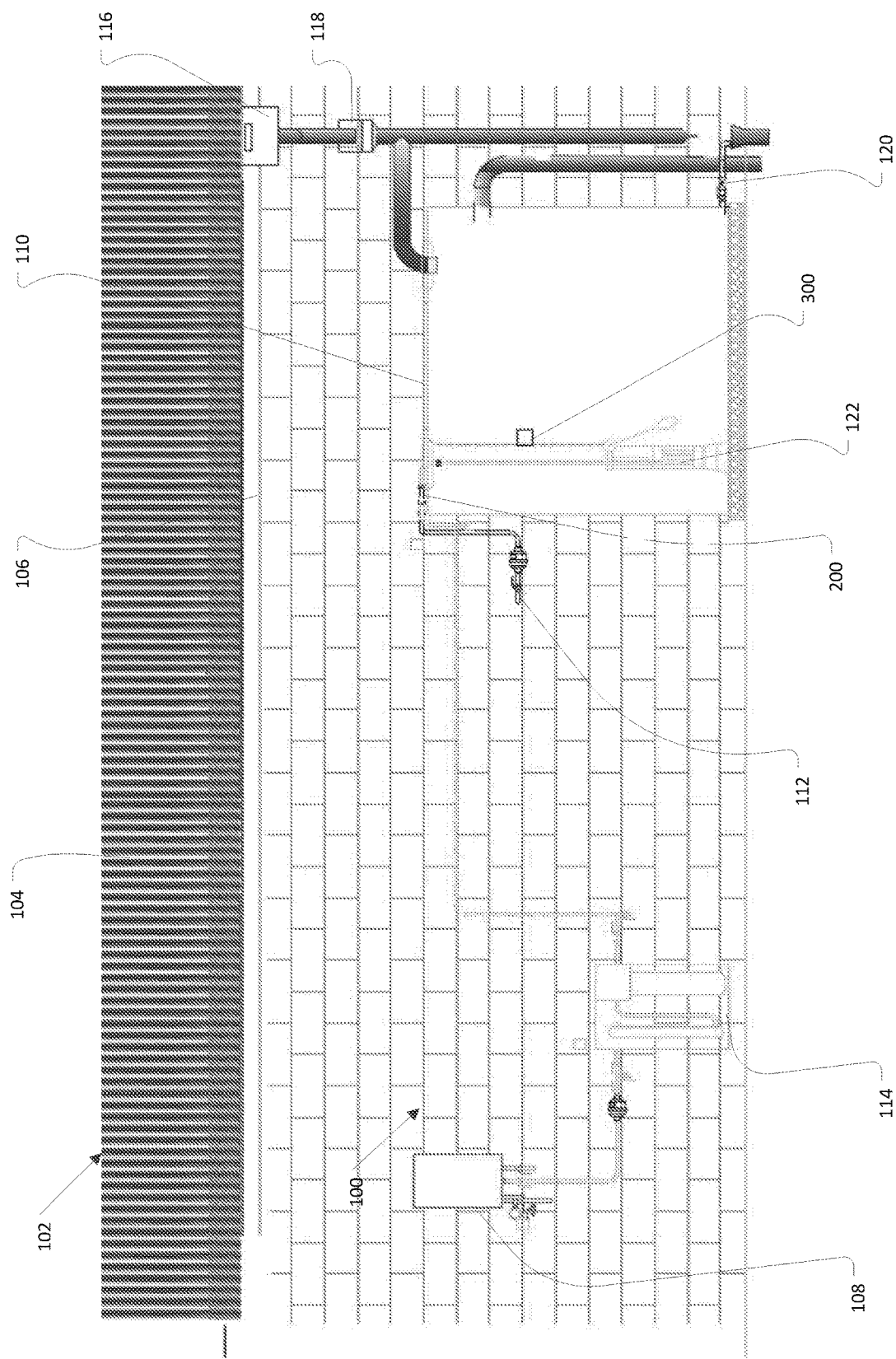
FIG. 2A is a perspective view of the installation of FIG. 1, according to some embodiments.

Referring to FIGS. 1 and 2A, there is shown an installation 100 deployed at a building such as a commercial or residential building 102 and configured to provide a hot water supply 124 to the building 102. The building 102 may comprise a roof 104 and a gutter 106, which may include a gutter guard (not shown), arranged to collect fluid, such as rain water, from the roof 104.

The installation 100 comprises a hot water unit or tank 108 coupled to and in fluid communication a potable or drinkable water source 112. The installation 100 further comprises a rainwater tank 110 coupled to and in fluid communication with the hot water unit 108.

In some embodiments, the installation 100 may comprise a UV treatment unit 114 in fluid communication with the rainwater tank 110 and the hot water unit 108. For example, in some embodiments, fluid conveyed from the rainwater tank 110 to the hot water unit 108 passes through the UV treatment unit 114 before being conveyed to the hot water unit 108. In some embodiments, the UV treatment unit 114 may be in fluid communication with the potable water source 112 and fluid conveyed from the potable water source 112 to the hot water unit 108 may pass through the UV treatment unit 114 before being conveyed to the hot water unit 108. In other embodiments, fluid extracted from the hot water unit 108 passes through the UV treatment unit 114 before being conveyed to the building 102.

In some embodiments, fluid from the roof 104 and/or collected in the gutter 106 and/or collected by other means is conveyed to a leaf catcher 116 and/or a first flush system 118 before being conveyed to the rainwater tank 110. In some embodiments, the rainwater tank 110 is provided with an outlet 120 to allow for selective discharge of fluid from the rainwater tank 110. As shown in FIGS. 1 and 2A, the rainwater tank 110 comprises a pump 122, which when activated, is configured to pump fluid from the rainwater tank 110 to the hot water unit 108.

Figure 2B:
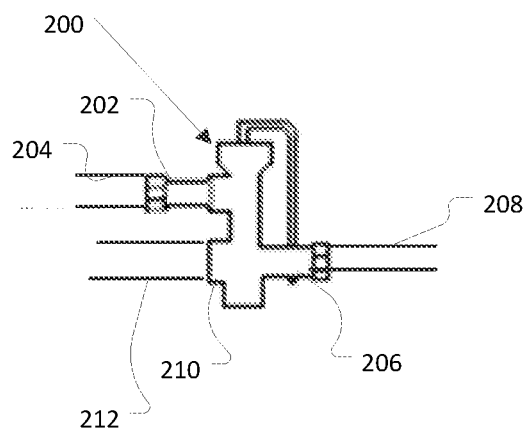
FIG. 2B is a schematic view of a switching device of the hot water unit fluid supply control system of FIGS. 1 and 2A, according to some embodiments.

The installation 100 comprises a hot water unit fluid supply control system 126 for controlling fluid supply to the hot water unit 108. The hot water unit fluid supply control system 126 comprises a switching device 200, as shown in FIGS. 2A and 2B, coupled to the hot water unit 108, the rainwater tank 110 and the potable water source 122. The switching device 200 is configured to selectively switch between a first state, which allows fluid communication between the hot water unit 108 and the rainwater tank 110, and a second state, which allows fluid communication between the hot water unit 108 and the potable water source 112. In some embodiments, the first and second states are mutually exclusive, in that the switching device 200 is capable of operating in one or other of the states at any one time, but not both. In some embodiments, the switching device 200 may be configured to selectively switch to a third state, which prevents fluid communication between the hot water unit 108 and both the hot water unit 108 and the potable water source 112. In some embodiments, the switching device 200 may be configured to selectively switch to a fourth state to allow fluid communication between the hot water unit 108 and an alternative water source, such as a recycled water source. In some embodiments, when the switching device 200 assumes the fourth state, fluid communication between the hot water unit 108 and both the hot water unit 108 and the potable water source 112 is prevented.

As shown in FIG. 2B, in some embodiments, the switching device 200 comprises a first inlet 202 coupled to a first conduit 204 arranged to convey fluid from the potable water source 112 to the switching device 200, a second inlet 206 coupled to a second conduit 208 arranged to convey fluid from the rainwater tank 110 to the switching device 200 and an outlet 210 coupled to a third conduit 212 arranged to convey fluid from the switching device 200 to the hot water unit 108.

In some embodiments, the UV treatment unit 114 is disposed upstream of the hot water unit 108 and downstream of the switching device 200 such that fluid conveyed from the rainwater tank 110 or potable water source 112 passes through the UV treatment unit 114 before being conveyed to the hot water unit 108. However, in other embodiments, the UV treatment unit 114 is disposed downstream of the hot water unit 108 and downstream of the switching device 200 such that fluid conveyed from the rainwater tank 110 or potable water source 112 does not pass through the UV treatment unit 114 before being conveyed to the hot water unit 108 but instead passes through the UV treatment unit 114 after being conveyed from the hot water unit 108.

In some embodiments, the switching device 200 is an automatic hydraulic switch. The switching device 200 may be configured to switch between the first and second states in response to detecting a pressure change in fluid supply from the rainwater tank 110. In some embodiments, a change in pressure of fluid supply from the rainwater tank 110 may arise as a result of activation or deactivation of the pump 122. In some embodiments, the switching device 200 may comprise an off-the-shelf mechanical changeover valve, such as the AcquaSaver™ manufactured by Beltrami Group Pty Ltd.

Figure 3:
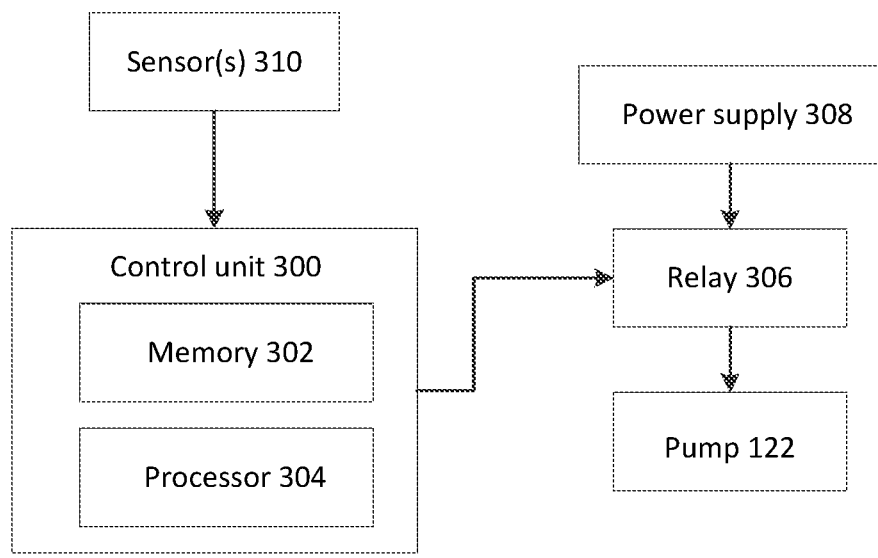
FIG. 3 is a block diagram of a control unit of the hot water unit fluid supply control system of FIGS. 1 and 2A.

The hot water unit fluid supply control system 126 further comprises a control unit 300, as exemplified in FIG. 3, configured to cause the switching device 200 to switch between states. The control unit 300 comprises a memory 302 comprising program instructions and a processor 304 configured to execute the program instructions to cause the control unit to perform operations described herein.

In some embodiments, the control unit 300 is arranged to control operations of the pump 122 of the rainwater tank 110. For example, the pump 122 may activate (turn on) or deactivate (turn off) in response to the action of a suitable pump contactor or relay 306 that supplies power from a power source 308, such as a mains power source and/or one or more batteries, to the pump 122 under control of the control unit 300. For example, the relay 306 may provide power to the pump 122 via suitable power cables (not shown) that extend into the rainwater tank 110 in a suitable manner. When activated, the pump 122 may be configured to pump rainwater out of the rainwater tank 110 via the second conduit 208 to the switching device 200.

It will be appreciated, however, that if the fluid level in the rainwater tank 110 drops below a given level, such as the pump intake, the pump 122 may be deactivated, for example to avoid damage. The pump 122 may also stop working due to other reasons, such as a power failure. In such circumstances, the resulting change in pressure of fluid supply from the rainwater tank 110 would cause the switching device 200 to switch between the first and second states, putting the hot water unit 108 in fluid communication with the potable water source 112.

In some embodiments, the control unit 300 unit may be configured to activate or deactivate the pump 122 to thereby cause a change in pressure of supply of fluid from the rainwater tank 110, through the second conduit 208 to the switching device 200, detectable by the switching device 200. For example, when the pump 122 is activated, the pressure of the supply from the rainwater tank 110 is relatively high, causing the switching device 200 to assume the first state, allowing fluid to be conveyed from the rainwater tank 110 through the switching device 200 to the hot water unit 108. When the pump 122 is deactivated, the pressure of the supply from the rainwater tank 110 is relatively low, causing the switching device 200 to assume the second state, preventing fluid to be conveyed from the rainwater tank 110 through the switching device 200 to the hot water unit 108 and instead allowing fluid to be conveyed from the potable water source 112 to the hot water unit 108.

In some embodiments, the switching device 200 may be or may comprise an electrically actuatable switching device and the control unit 300 may be configured to transmit a signal to the switching device 200 to trigger switching of the switching device 200. The control unit 300 may also be configured to activate and deactivate the pump 122 of the rainwater tank 110. For example, the control unit 300 may be configured to activate the pump when the switching device 200 assumes the first state and to deactivate the pump 122 of the rainwater tank when the switching device 200 assumes the second state. In some embodiments, the control unit 300 triggers switching of the switching device 200 at substantially the same time or shortly before or after the control unit 300 activates or deactivates the pump 122.

In some embodiments, the control unit 300 is arranged to control operations of the pump 122 of the rainwater tank 110 in response to signals received from one or more sensors 310. For example, sensor(s) 310 may be in electrical communication with the control unit 300 via suitable means, such as via an electrical cable.

In some embodiments, one or more of the sensor(s) 310 are configured to sensor or detect fluid characteristics of fluid within, exiting or being provided to the hot water unit 108 and to provide fluid characteristic information to the control unit 300. For example, in some embodiments, at least one of the one or more of the sensors 310 comprises a temperature sensor disposed at or in the hot water unit 108 and is configured to configured to detect temperature of fluid in the hot water unit 108. In some embodiments, the temperature sensor is provided a top or exit of the hot water unit 108. In some embodiments, at least one of the one or more of the sensors 310 comprises a flow sensor disposed at or in the hot water unit 108 and is configured to detect flow rate of fluid exiting the hot water unit 108. In some embodiments, at least one of the one or more of the sensors 310 comprises a fluid quality sensor disposed at or in the UV treatment unit and/or at or in the hot water unit 114 to detect the quality of the fluid of the hot water unit 108. For example, the fluid quality sensor may be configured to sense or detect water quality characteristics such as pH, turbidity, and electrical conductivity.

In some embodiments, one or more of the sensor(s) 310 are configured to sense or detect operations characteristics associated with the ultraviolet (UV) treatment unit 114 in fluid communication with the hot water unit 108 and to provide operations information to the control unit 300. In some embodiments, at least one of the one or more of the sensors 310 comprises a UV treatment sensor disposed at or in the UV treatment unit and/or at or in the hot water unit 114 to detect operations information associated with the UV treatment unit, for example, an indication of whether or not the UV treatment unit is operating effectively. In some embodiments, the one or more of the sensor(s) 310 are configured to sense or detect the efficacy or efficiency of the UV treatment unit 114. For example, the control unit 300 may be configured to monitor an output signal of the UV treatment unit to determine whether the UV treatment unit 114 is operating effectively. In some embodiments, one or more UV treatment sensors are employed to detect UV light transmission across fluid volume in the UV treatment unit 114. For example, a UV light transmission value may be a percentage transmittance value at 254 nm.

The control unit 300 is configured to compare the fluid characteristic information and/or operations information with requirements for the hot water unit 108. Requirements for the hot water unit 108 may comprise one or more of a plurality of ranges, set points and/or threshold values, for example, to ensure efficient and/or safe operation of the hot water unit 108. The requirements of the hot water tank 108 may be stored in the memory 302 of the control unit 300. In some embodiments, the requirements may comprises temperature requirements, fluid flow requirements, fluid quality requirements and/or UV operation requirements.

In some embodiments, the temperature requirements may comprise a threshold fluid temperature, which may be a minimum and/or maximum fluid temperature; the fluid flow requirements may comprise a threshold fluid flow value, which may be a minimum and/or maximum fluid flow value; the fluid quality requirements may comprise a threshold fluid quality value, which may be a minimum and/or maximum fluid quality value; and/or the UV operation requirements may comprise a threshold lamp efficiency value, which may be a maximum and/or minimum lamp efficiency value. In some embodiments, the UV operation requirements may require compliance with a threshold transmittance value, for example, of about 70%. If the detected transmittance value is less than the threshold transmittance value, it may be an indication that the UV treatment unit 114 is not operating effectively, for example, due to turbidity and/or lamp age.

In some embodiments, the control unit 300 is configured to determine a parameter value from the fluid characteristic information and/or operations information and to compare the fluid characteristic parameter and/or the operations parameter with the hot water tank 108 requirements, such as a threshold value, and to determine whether or not to activate or deactivate the pump 122 of the rainwater tank 110 based on the comparison. Thus, whether or not the switching device 200 is caused to assume the first state or the second state is based on the comparison of the parameter with a threshold value.

In some embodiments, the control unit 300 may comprise one or more wired or wireless transceivers (not shown) and may be configured to communicate with a remote server (not shown), such as a SCADA system, flow meters and/or other instruments (not shown) associated with water, power or other utilities. In some embodiments, the memory 302 may be configured to store a number of set points and/or control parameters for operation of the pump 122 and any other components of the hot water unit fluid supply control system 126. In some embodiments, the requirements of the hot water unit 108 and/or set points and/or control parameters for operation of the pump 122 and/or any other components of the hot water unit fluid supply control system 126 stored in the memory 302 may be altered or changed locally by the control unit 300 or remotely by the remote server (not shown) in communication with the control unit 300. For example, ranges, set points, thresholds and/or control parameters may be altered or changed by the control unit 300 in response to instructions received from remote server (not shown). In some embodiments, the control unit 300 may be configured to increase or decrease ranges, set points, thresholds and/or control parameters by an specific amount specified by the remote server (not shown) or to a next level predetermined at the control unit 300. In some embodiments, the control unit 300 may be configured to replace a stored value for ranges, set points, thresholds and/or control parameters with a value determined and/or provided by the remote server (not shown). For example, in some embodiments, the remote server (not shown) may be configured to predict future usage patterns associated with a particular installation 100 based on determined usage patterns, The remote server (not shown) may determine values for the requirements of the hot water unit 108 and/or set points and/or control parameters for operation of the pump 122 and/or any other components of the hot water unit fluid supply control system 126 of the installation based on the predicted usage patterns and transmit a signal to the control unit 300 to cause the control unit 300 to alter or replace stored values for ranges, set points, thresholds and/or control parameters with determined values.

Figure 4:
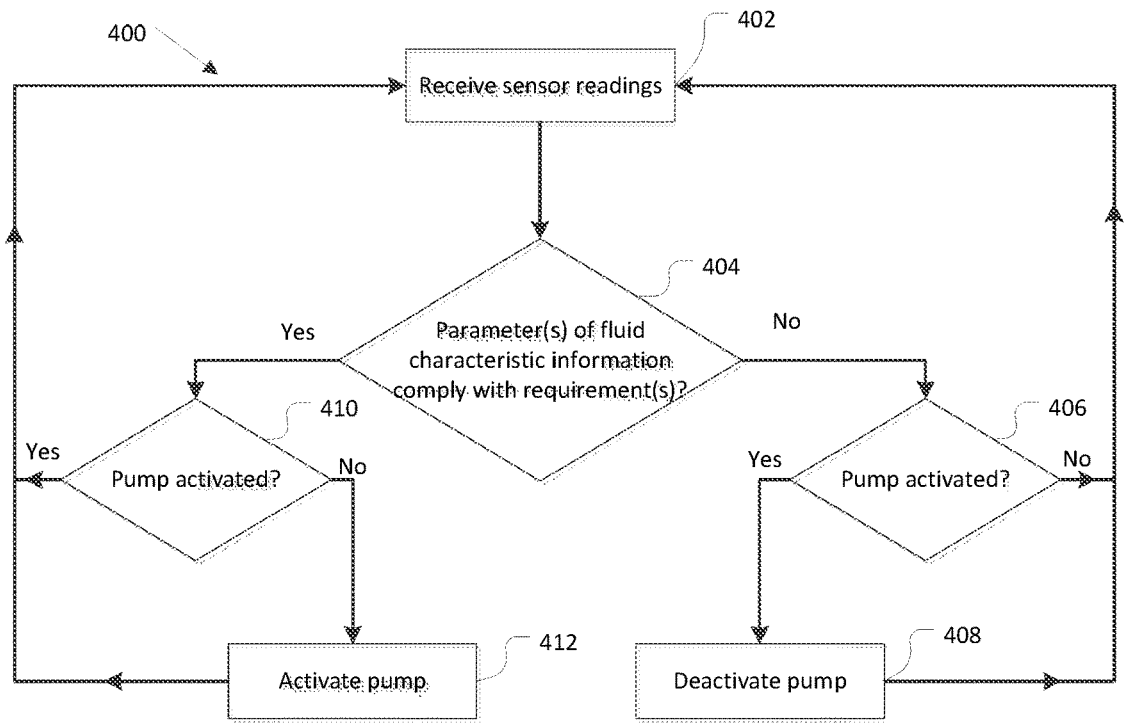
FIG. 4 is a process flow diagram of a method of controlling a hot water unit, the method operable by a controller of the hot water unit fluid supply control system of FIGS. 1 and 2A, according to some embodiments.

Referring now to FIG. 4, there is shown a process flow diagram of a method 400 of controlling a hot water unit, (or more particularly, a method of controlling fluid supply to a hot water unit), the method operable by the control unit 300 of the hot water unit fluid supply control system 126, according to some embodiments. In particular, the processor 304 of the control unit 300 is configured to execute instructions stored in the memory 302 to perform the method 400.

The control unit 300 is configured to receive sensor readings from the one or more sensors 310, at 402. For example, the sensor readings may comprise fluid characteristic information, as discussed above.

The control unit 300 is configured to determine one or more parameter values from the fluid characteristic information and to compare the fluid characteristic parameter with the requirements of the hot water tank 108, at 404.

If the control unit 300 determines that the fluid characteristic parameter does not meet or comply with the requirements of the hot water tank 108, the control unit 300 is configured to determine if the pump 114 is activated, at 406. If the control unit 300 determines that the pump 114 is not activated, the method returns to step 402 and the control unit 300 awaits receipt of further sensor readings. If the control unit 300 determines that the pump 114 is activated, the control unit 300 deactivates the pump, at 408 and the method returns to step 402 and the control unit 300 awaits receipt of further sensor readings.

If the control unit 300 determines that the fluid characteristic parameter meets or complies with the requirements of the hot water tank 108, the control unit 300 is configured to determine if the pump 114 is activated, at 410. If the control unit 300 determines that the pump 114 is activated, the method returns to step 402 and the control unit 300 awaits receipt of further sensor readings. If the control unit 300 determines that the pump 114 is not activated, the control unit 300 activates the pump, at 412 and the method returns to step 402 and the control unit 300 awaits receipt of further sensor readings.

In some embodiments, where the fluid characteristic information comprises temperature information, the control unit 300 may be configured to determine the temperature of the fluid in the hot water unit 108 as the fluid characteristic parameter and to compare the determined temperature to a threshold value, such as a minimum temperature value. If the determined temperature is greater than the threshold value, the control unit 300 may be configured to activate the pump 112 to thereby cause the switching device 200 to assume the first state (or allow the pump to remain activated, whereby the switching device 200 would remain in the first state), allowing fluid to be conveyed from the rainwater tank 110 through the switching device 200 to the hot water unit 108. If the determined temperature is less than the threshold value, the control unit 300 may be configured to deactivate the pump 112 to thereby cause the switching device 200 to assume the second state (or allow the pump to remain deactivated, whereby the switching device 200 would remain in the second state), allowing fluid to be conveyed from the potable water source 112 through the switching device 200 to the hot water unit 108 and preventing fluid being conveyed from the rainwater tank 110 through the switching device 200 to the hot water unit 108.

For example, the threshold value or a minimum temperature value may be approximately 60° C., which is believed to be sufficient to control Legionella and for pathogen kill. Thus, in some embodiments, if the control unit 300 detects that the temperature in the hot water tank 108 is less than 60° C., it is configured to deactivate the pump 122, causing a drop in water pressure supply from the rainwater tank 110 and the switching of the switching device 200 to put the hot water unit 108 in fluid communication with the potable supply 112. Once the hot water unit 108 has recovered to the target 60° C. temperature, the control unit 300 will reactivate the pump 122 and accordingly, allow fluid, if available, to flow from the rainwater tank 110 to the hot water unit 108.

Similarly, in some embodiments, where the fluid characteristic information comprises fluid flow information, the control unit 300 may be configured to determine the flow rate of the fluid exiting the hot water unit 108 and to employ the flow rate to monitor and/or determine a volume of fluid being provided to and/or extracted from the hot water unit. For example, the fluid characteristic parameter may comprise a fluid volume. The control unit 300 may be configured to compare the determined fluid volume to a threshold value, such as a maximum fluid volume. If the determined fluid volume is less than the threshold value, the control unit 300 may be configured to activate the pump 112 to thereby cause the switching device 200 to assume the first state (or allow the pump to remain activated, whereby the switching device 200 would remain in the first state), allowing fluid to be conveyed from the rainwater tank 110 through the switching device 200 to the hot water unit 108. For example, the threshold value may be 200 L for a 300 L hot water unit 108. If the determined fluid volume is greater than the threshold value, the control unit 300 may be configured to deactivate the pump 112 to thereby cause the switching device 200 to assume the second state (or allow the pump to remain deactivated, whereby the switching device 200 would remain in the second state), allowing fluid to be conveyed from the potable water source 112 through the switching device 200 to the hot water unit 108 and preventing fluid being conveyed from the rainwater tank 110 through the switching device 200 to the hot water unit 108. For example, the provision of a given or threshold amount of fluid to the hot water unit 108 and/or extraction of a given or threshold amount of fluid from the hot water unit 108 may serve as an indication that the temperature of the fluid in the hot water tank 108 is likely to drop to a value below a desired or the threshold value, such as 60 degrees. The control unit may therefore be configured to switch off the pump 112, and hence trigger the switching device 200 to disallow fluid from the rainwater tank 110 to be conveyed to the hot water unit 108 and allow fluid from the potable water source 122 to be conveyed to the hot water unit 108, as a pre-emptive measure to aid recovery time of the hot water unit 108.

Similarly, in some embodiments, where the fluid characteristic information comprises fluid quality information, the control unit 300 may be configured to determine a measure of the quality of the fluid in the hot water unit 108 as the fluid characteristic parameter and to compare the determined quality measure to a threshold value, such as a minimum PH value. If the determined quality measure is greater than the threshold value, the control unit 300 may be configured to activate the pump 112 to thereby cause the switching device 200 to assume the first state (or allow the pump to remain activated, whereby the switching device 200 would remain in the first state), allowing fluid to be conveyed from the rainwater tank 110 through the switching device 200 to the hot water unit 108. If the determined quality measure is less than the threshold value, the control unit 300 may be configured to deactivate the pump 112 to thereby cause the switching device 200 to assume the second state (or allow the pump to remain deactivated, whereby the switching device 200 would remain in the second state), allowing fluid to be conveyed from the potable water source 112 through the switching device 200 to the hot water unit 108 and preventing fluid being conveyed from the rainwater tank 110 through the switching device 200 to the hot water unit 108.

Figure 5:
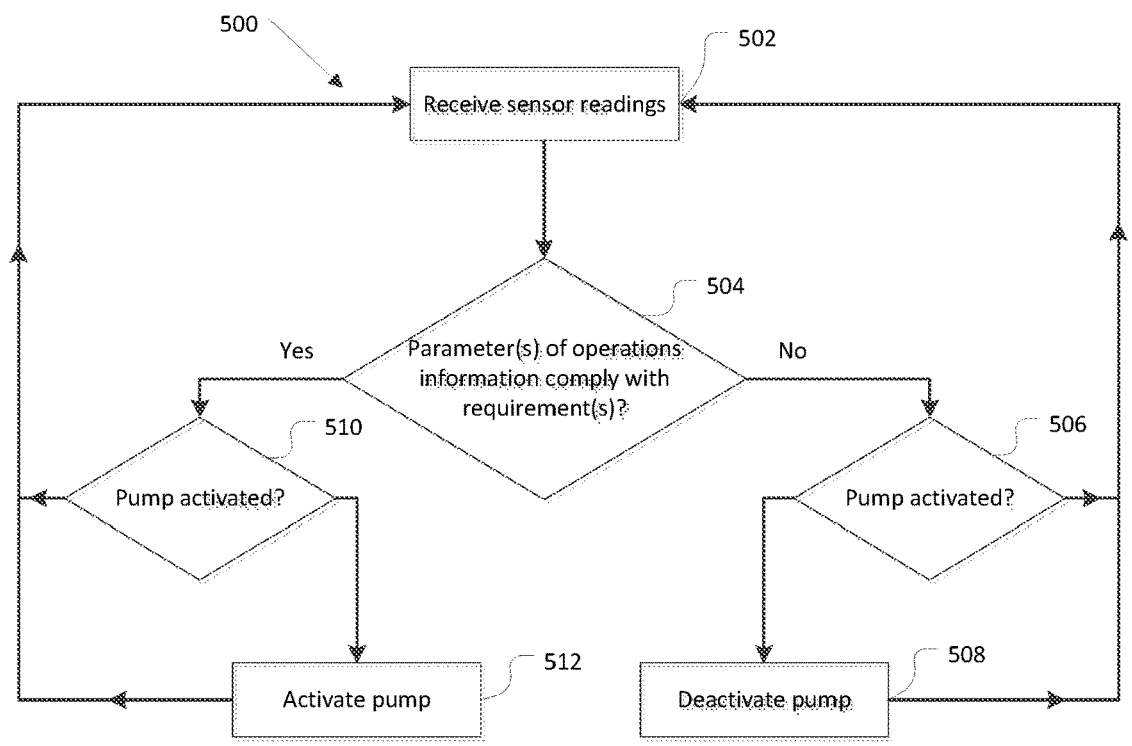
FIG. 5 is a process flow diagram of a method of controlling a hot water unit, the method operable by a controller of the hot water unit fluid supply control system of FIGS. 1 and 2A, according to some embodiments.

Referring now to FIG. 5, there is shown a process flow diagram of a method 500 of controlling a hot water unit, (or more particularly, a method of controlling fluid supply to a hot water unit,) the method operable by the control unit 300 of the hot water unit fluid supply control system 126, according to some embodiments. In particular, the processor 304 of the control unit 300 is configured to execute instructions stored in the memory 302 to perform the method 500.

The control unit 300 is configured to receive sensor readings from the one or more sensors 310, at 502. For example, the sensor readings may comprise operations information, as discussed above.

The control unit 300 is configured to determine one or more parameter values from the operations information and to compare the operations parameter with the requirements of the hot water tank 108, at 504.

If the control unit 300 determines that the operations parameter does not meet or comply with the requirements of the hot water tank 108, the control unit 300 is configured to determine if the pump 114 is activated, at 506. If the control unit 300 determines that the pump 114 is not activated, the method returns to step 402 and the control unit 300 awaits receipt of further sensor readings. If the control unit 300 determines that the pump 114 is activated, the control unit 300 deactivates the pump, at 508 and the method returns to step 502 and the control unit 300 awaits receipt of further sensor readings.

If the control unit 300 determines that the operations parameter meets or complies with the requirements of the hot water tank 108, the control unit 300 is configured to determine if the pump 114 is activated, at 510. If the control unit 300 determines that the pump 114 is activated, the method returns to step 502 and the control unit 300 awaits receipt of further sensor readings. If the control unit 300 determines that the pump 114 is not activated, the control unit 300 activates the pump, at 512 and the method returns to step 502 and the control unit 300 awaits receipt of further sensor readings.

In some embodiments, where the operations information comprises an indication of whether or not the UV treatment unit 114 is operating effectively, the control unit 300 may be configured to determine the indication as the operations parameter and to compare the operations parameter to a threshold value, such as a lamp efficiency value. If the determined lamp efficiency value is greater than the threshold value, the control unit 300 may be configured to activate the pump 112 to thereby cause the switching device 200 to assume the first state (or allow the pump to remain activated, whereby the switching device 200 would remain in the first state), allowing fluid to be conveyed from the rainwater tank 110 through the switching device 200 to the hot water unit 108. If the determined lamp efficiency value is less than the threshold value, the control unit 300 may be configured to deactivate the pump 112 to thereby cause the switching device 200 to assume the second state (or allow the pump to remain deactivated, whereby the switching device 200 would remain in the second state), allowing fluid to be conveyed from the potable water source 112 through the switching device 200 to the hot water unit 108 and preventing fluid being conveyed from the rainwater tank 110 through the switching device 200 to the hot water unit 108.

Figure 6:
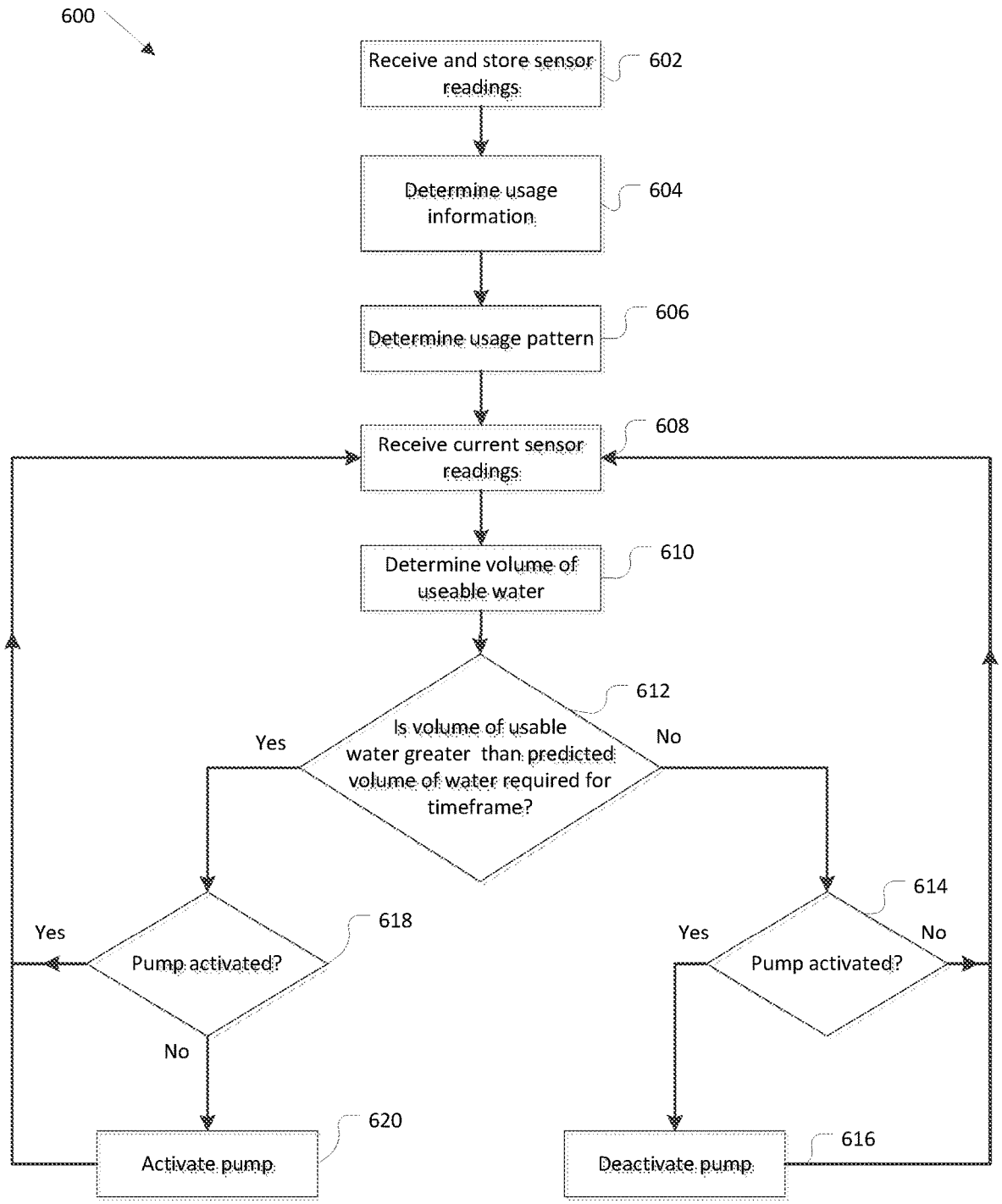
FIG. 6 is a process flow diagram of a method of controlling a hot water unit, the method operable by a controller of the hot water unit fluid supply control system of FIGS. 1 and 2A, according to some embodiments.

Referring now to FIG. 6, there is shown a process flow diagram of a method 600 of controlling fluid supply to a hot water unit 108, (or more particularly, a method of controlling fluid supply to a hot water unit), the method operable by the control unit 300 of the hot water unit fluid supply control system 126, according to some embodiments. In particular, the processor 304 of the control unit 300 is configured to execute instructions stored in the memory 302 to perform the method 600.

The control unit 300 is configured to receive sensor readings from the one or more sensors 310 of an installation 100 and to store the readings in the memory 302, at 602. For example, the sensor readings may comprise fluid characteristic information associated with fluid in the hot water unit, as discussed above. In some embodiments, the fluid characteristic information is indicative of a volume of usable water in the hot water unit.

The control unit 300 is configured to determine usage information from the fluid characteristic information of the sensor readings, at 604. The usage information may comprise a volume of fluid being drawn from the hot water unit 108 during a timeframe. For example, the timeframe may be an hourly period. The control unit 300 may be configured to store the determined usage volumes during a timeframe over a period of time. For example, the usage information may comprise a volume of fluid drawn from the hot water unit 108 during each hour of a day, for a number of days or week.

The control unit 300 is configured to determine a behaviour or usage pattern for the installation for the period of time based on the usage information, at 606. For example, the control unit 300 may the usage pattern to infer or predict a likely volume of fluid to be drawn for a particular hour on a particular day, for example, a predicted volume of fluid to be drawn from the hot water unit on a Tuesday between 9 am and 10 am. In some embodiments, the behaviour or usage pattern may comprise a plurality of timeframes and a predicted volume of fluid associated with each timeframe for a period of time. For example, the usage pattern may comprises a plurality of usage entries, wherein each usage entry comprising fluid characteristic information indicative of a volume of useable water in the hot water unit for a timeframe. For example, the timeframe may be a period of time and in some embodiments, may be associated with a particular time period of a day, or a particular day or the week, month or year.

The control unit may be configured to continue to record sensor readings and dynamically update or change the predicted values to refine the determined behaviour or usage pattern over time. For example, the usage pattern may be updated periodically or in response to receiving fluid characteristic information associated with fluid in the hot water unit from one or more sensors. In some embodiments, additional information, such as weather forecast, predicted or known times during which the premises won't be occupied or when there may be less or more demands due to school holidays or visitors etc, may be employed to better inform a determination of the usage or behaviour pattern.

The control unit 300 is configured to receive current sensor readings from the one or more sensors 310 of an installation 100, at 608, where the current sensor readings are indicative of a quality of the fluid in the hot water unit 108 and a quantity of the fluid in the hot water unit 108 at a particular time. For example, in some embodiments, the current sensor readings indicative of a quality of the fluid in the hot water unit are temperature readings indicative of a temperature of the fluid in the hot water unit 108. In some embodiments, the current sensor readings indicative of the quantity of fluid in the hot water unit are flow rate readings indicative of flow rate value and/or a fluid volume value.

The control unit 300 is configured to determine whether a volume of useable water in the hot water unit 108, at 610. In some embodiments, the control unit 300 may be configured to compare the volume and temperature of the fluid in the hot water unit 108 with threshold values, for example, as may be stored in memory 302, to determine the volume of usable water. For example, if it is determined that the fluid in the hot water unit 108 has a temperature of less than a threshold value deemed safe, for example, 60 degrees, it may be determined that the volume of useable water in the hot water unit 108 is 0 L.

The control unit 300 determines whether the volume of useable water is greater than the predicted volume of water required for the timeframe, at 612. For example, the control unit 300 compares the determined volume of usable water with the predicted volume of water required for the timeframe that corresponds with the time associated with the current sensor readings.

If the control unit 300 determines that the volume of useable water is not greater than the predicted volume of water required for the timeframe, the control unit 300 is configured to determine if the pump 122 is activated, at 614. If the control unit 300 determines that the pump 122 is not activated, the method returns to step 608 and the control unit 300 awaits receipt of further sensor readings. If the control unit 300 determines that the pump 122 is activated, the control unit 300 deactivates the pump 122, at 616 and the method returns to step 608 and the control unit 300 awaits receipt of further sensor readings.

If the control unit 300 determines that the volume of useable water is greater than the predicted volume of water required for the timeframe, the control unit 300 is configured to determine if the pump 122 is activated, at 618. If the control unit 300 determines that the pump 122 is activated, the method returns to step 608 and the control unit 300 awaits receipt of further sensor readings. If the control unit 300 determines that the pump 122 is not activated, the control unit 300 activates the pump 122, at 620 and the method returns to step 608 and the control unit 300 awaits receipt of further sensor readings.

In some embodiments, the control unit 300 may be configured to transmit the sensor readings received at 602 to the remote server (not shown) to allow the remote server (not shown) to perform data analysis and usage prediction analysis. The remote server (not shown) may generate a usage pattern and transmit the usage pattern to the control unit 300 for use in the method of 600. Thus, the remote server (not shown) may perform step 606, and in some embodiments step 604, as opposed to or in addition to the control unit performing these steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A hot water unit fluid supply control system comprising:
    a hot water unit;
    a switching device coupled to the hot water unit, a rainwater tank and a potable water source, the switching device configured to selectively switch between a first state, which allows fluid communication between the hot water unit and the rainwater tank, and a second state, which allows fluid communication between the hot water unit and the potable water source; and
    a control unit configured to:
        receive fluid characteristic information associated with fluid in the hot water unit from one or more sensors; and
        cause the switching device to assume the first or second state based on a comparison of a fluid characteristic parameter of the fluid characteristic information with requirements of the hot water unit, wherein the control unit is configured to activate a pump of the rainwater tank to cause a pressure change in fluid supply from the rainwater tank and thereby cause the switching device to assume the first state and to deactivate a pump of the rainwater tank to cause the switching device to assume the second state, wherein at least one of the one or more sensors is configured to detect fluid temperature in the hot water unit, and wherein the fluid characteristic parameter comprises a temperature value.

2. The hot water unit fluid supply control system of claim 1, wherein the requirements comprise a fluid characteristic threshold value and the control unit is configured to cause the switching device to assume the first state in response to determining that the fluid characteristic parameter is greater than the fluid characteristic threshold value and to assume the second state in response to determining that the fluid characteristic parameter is less than the fluid characteristic threshold value.

3. The hot water unit fluid supply control system of claim 1, wherein the switching device comprises an automatic hydraulic switch.

4. The hot water unit fluid supply control system of claim 1, wherein the switching device comprises:
    a first inlet coupled to a first conduit arranged to convey fluid from the potable water source to the switching device;
    a second inlet coupled to a second conduit arranged to convey fluid from the rainwater tank to the switching device; and
    an outlet coupled to a third conduit arranged to convey fluid from the switching device to the hot water unit.

5. The hot water unit fluid supply control system of claim 1, wherein at least one of the one or more sensors is configured to detect flow rate of fluid exiting the hot water unit and wherein the fluid characteristic parameter comprises at least one of a flow rate value and a fluid volume value.

6. The hot water unit fluid supply control system of claim 1, wherein at least one of the one or more sensors is configured to detect a measure of water quality of fluid in the hot water unit and wherein the fluid characteristic parameter comprises a water quality value.

7. The hot water unit fluid supply control system of claim 1, wherein at least one of the one or more sensors is configured to detect operations information associated with an ultraviolet (UV) treatment unit and wherein the control unit is configured to cause the switching device to assume the first or second state based on a comparison of an operations parameter of the operations information with an operations threshold value.

8. The hot water unit fluid supply control system of claim 7, wherein the operations parameter comprises an indication of whether the UV treatment unit is operating effectively.

9. The hot water unit fluid supply control system of claim 7, wherein the control unit is configured to cause the switching device to assume the first state in response to determining that the operations parameter is greater than the operations threshold value and to assume the second state in response to determining that the operations parameter is less than the operations threshold value.

10. The hot water unit fluid supply control system of claim 7, wherein the UV treatment unit is disposed upstream of the hot water unit and downstream of the switching device such that fluid conveyed from the rainwater tank or potable water source passes through the UV treatment unit before being conveyed to the hot water unit.

11. The hot water unit fluid supply control system of claim 7, further comprising the UV treatment unit.

12. A method of controlling fluid supply to a hot water unit, the method operable by a hot water unit control system comprising the hot water unit, a switching device coupled to the hot water unit, a rainwater tank and a potable water source, wherein the switching device is configured to selectively switch between a first state, which allows fluid communication between the hot water unit and the rainwater tank, and a second state, which allows fluid communication between the hot water unit and the potable water source, and a control unit, the method comprising:

receiving, by the control unit, fluid characteristic information associated with fluid in the hot water unit from one or more sensors; and causing, by the control unit, the switching device to assume the first state or the second state based on a comparison of a fluid characteristic parameter of the fluid characteristic information with requirements of the hot water unit, wherein the control unit is configured to activate a pump of the rainwater tank to cause a pressure change in fluid supply from the rainwater tank and thereby cause the switching device to assume the first state and to deactivate a pump of the rainwater tank to cause the switching device to assume the second state, wherein at least one of the one or more sensors is configured to detect fluid temperature in the hot water unit, and wherein the fluid characteristic parameter of the fluid characteristic information comprises a temperature value.

13. The method of claim 12, wherein the requirements comprise a fluid characteristic threshold value and wherein causing the switching device to assume the first state or the second state comprises causing the switching device to assume the first state in response to determining that the fluid characteristic parameter of the fluid characteristic information is greater than the fluid characteristic threshold value and causing the switching device to assume the second state in response to determining that a parameter of the fluid characteristic information is less than the fluid characteristic threshold value.

14. The method of claim 12, wherein causing the switching device to assume the first state comprises activating a pump of the rainwater tank.

15. The method of claim 12, wherein causing the switching device to assume the second state comprises deactivating a pump of the rainwater tank.

16. The method of claim 12, wherein at least one of the one or more sensors is configured to detect flow rate of fluid exiting the hot water unit and wherein the fluid characteristic parameter of the fluid characteristic information comprises at least one of a flow rate value and a fluid volume value.

17. The method of claim 12, wherein at least one of the one or more sensors is configured to detect a measure of water quality of fluid in the hot water unit and wherein the fluid characteristic parameter comprises a water quality value.

18. The method of claim 12, wherein at least one of the one or more sensors is configured to detect operations information associated with a UV treatment unit and the method further comprises causing the switching device to assume the first or second state based on a comparison of an operations parameter of the operations information with an operations threshold value.

19. The method of claim 18, wherein the operations parameter comprises an indication of whether the UV treatment unit is operating effectively.

20. A method of controlling fluid supply to a hot water unit at an installation, the method operable by a hot water unit control system comprising the hot water unit; a switching device coupled to the hot water unit, a rainwater tank and a potable water source, wherein the switching device is configured to selectively switch between a first state, which allows fluid communication between the hot water unit and the rainwater tank, and a second state, which allows fluid communication between the hot water unit and the potable water source, and a control unit, the method comprising:

receiving, by the control unit, fluid characteristic information associated with fluid in the hot water unit from one or more sensors, wherein the fluid characteristic information is indicative of a volume of usable water in the hot water unit;

determining, from a usage pattern associated with the installation, a predicted volume of water required in a timeframe; and causing, by the control unit, the switching device to assume the first state or the second state based on a comparison of the volume of usable water with the predicted volume of water required for the timeframe, wherein the control unit is configured to activate a pump of the rainwater tank to cause a pressure change in fluid supply from the rainwater tank and thereby cause the switching device to assume the first state and to deactivate a pump of the rainwater tank to cause the switching device to assume the second state, wherein at least one of the one or more sensors is configured to detect fluid temperature in the hot water unit, wherein a fluid characteristic parameter of the fluid characteristic information comprises a temperature value; and further comprising causing, by the control unit, the switching device to assume the first state or the second state based on a comparison of the fluid characteristic parameter of the fluid characteristic information with requirements of the hot water unit.

21. A hot water unit fluid supply control system comprising:

a switching device coupled to a hot water unit, a rainwater tank and a potable water source associated with an installation, the switching device configured to selectively switch between a first state, which allows fluid communication between the hot water unit and the rainwater tank, and a second state, which allows fluid communication between the hot water unit and the potable water source; and a control unit configured to perform the method of claim 20.

* * * * *